United States Patent [19]

Yamashita et al.

[11] Patent Number: 5,150,763
[45] Date of Patent: Sep. 29, 1992

[54] WIRING AND PIPING ARRANGEMENT FOR A VEHICLE MOTOR

[75] Inventors: Mitugu Yamashita; Mutsumi Kawamoto, both of Tokyo; Hidemitsu Inagaki, Nishio, all of Japan

[73] Assignee: Aisin AW Co., Ltd., Japan

[21] Appl. No.: 690,158

[22] Filed: Apr. 24, 1991

[51] Int. Cl.⁵ .............................................. B60K 17/30
[52] U.S. Cl. .................................. 180/252; 180/242; 180/65.5; 180/265
[58] Field of Search ............... 180/252, 253, 238, 242, 180/65.1, 65.5, 265

[56] References Cited

U.S. PATENT DOCUMENTS

| | | | |
|---|---|---|---|
| 3,163,250 | 12/1964 | Gibson | 180/253 |
| 3,566,165 | 2/1971 | Lohr | 180/65.5 X |
| 4,913,258 | 4/1990 | Sakurai et al. | 180/242 |

FOREIGN PATENT DOCUMENTS 454464 10/1936 United Kingdom ............... 180/65.5

Primary Examiner—H. Grant Skaggs
Assistant Examiner—Carol Lynn Druzbick
Attorney, Agent, or Firm—Lorusso & Loud

[57] ABSTRACT

A wiring and piping arrangement for a vehicle motor comprises a wheel motor connected to a wheel, a wheel support member connected to a vehicle frame through a damper, an internal gear rotatably supported on the wheel support member, and a pivot fixed to a casing of the wheel motor. The pivot is provided with an external gear meshing with said internal gear. The arrangement further comprises a wiring and/or piping for the wheel motor extended through an interior or said pivot. Since the wirings and pipings are extended through the pivot for a steering operation of the wheel motor, the wiring and/or piping are required to have slacks or extra lengths which allow only the vertical movement of the wheel, and are not required to have the slacks for allowing the lateral movement of the wheel.

5 Claims, 2 Drawing Sheets

WIRING AND PIPING ARRANGEMENT FOR A VEHICLE MOTOR

BACKGROUND OF THE INVENTION

1. Field of the Invention

The present invention relates to a wiring and piping arrangement for a vehicle motor used in an electric automobile.

2. Description of the Prior Art

In recent years, in view of environmental problems, electric automobiles have been extensively developed. One type uses wheel motors wherein each motor is directly connected to a corresponding wheel through a reduction gear. Since this type employs driving sources which are respectively associated with individual wheels, each wheel can pivot through 90 degrees both in the right and left directions with respect to the straight advance direction, and thus can provide advantageous functions such as a small turning radius and parallel movement.

For actuating the wheel motors, a battery and a control device on a vehicle body are connected to the motors through power wirings and control wirings, and hydraulic conduits are connected to the wheel motors for braking the wheel motors by means of a brake pedal provided in the vehicle. In the prior art, these wires and hydraulic conduits extended from rear surfaces of the wheel motors through a lower part of the body to an upper part of the body.

However, the arrangement, in which the wires and hydraulic conduits extended from the rear surfaces of the wheel motors through the lower part of the body to the upper part of the body, created a problem that it required extra lengths of the wirings and conduits to allow the wheels move laterally and vertically. This problem is particularly evident where the wheels are adapted to pivot through 90 degrees in both the right and left directions with respect to the straight advance direction. Moreover, the wirings and/or conduits having extra lengths may cause a problem by interference with the suspension and/or contact with the road surface when the wheels are in the straight ahead positions. In order to prevent such problems, the wirings and conduits must be supported by appropriate means such as elastic hooks.

Accordingly, it is an object of the invention to provide a wiring and conduit arrangement for a vehicle motor, overcoming the above noted problems, in which the wheel motor wiring and conduits are not required to have extra lengths, and thus neither interfere with the suspension nor contact with the road surface.

SUMMARY OF THE INVENTION

A wiring and conduit arrangement for a vehicle motor according to the invention comprises a wheel motor (12) connected to a wheel (15), a wheel support member (3) connected to a vehicle frame (1) through a shock absorber (2), an internal gear (6) rotatably supported on the wheel support member, a pivot (9) fixed to a casing (13) of the wheel motor and provided with an external gear (7) meshing with said internal gear (6), and a wiring cable (23) for the wheel motor extended through the interior of said pivot (9).

According to the present invention, since the wiring (23) and conduits are extended through the pivot (9) provided for steering operation of the wheel motor (12), for example, as shown in FIGS. 1 and 2, the wiring and conduits are required to have only that slack or extra length which allow vertical movement of the wheel, and are not required to have slack for allowing a lateral movement of the wheel.

Therefore, the wirings and conduit are not required to have excessive lengths, and thus the interference with the suspension and contact with the road surface can be prevented.

It should be noted that reference numbers are allotted to the above described structures and components only for reference to the drawings, and are not intended to restrict the invention in any way.

These and other objects and features of the invention will become more apparent from the following description of preferred embodiments with reference to the accompanying drawings.

DETAILED DESCRIPTION OF THE PREFERRED EMBODIMENTS

Figure 1:
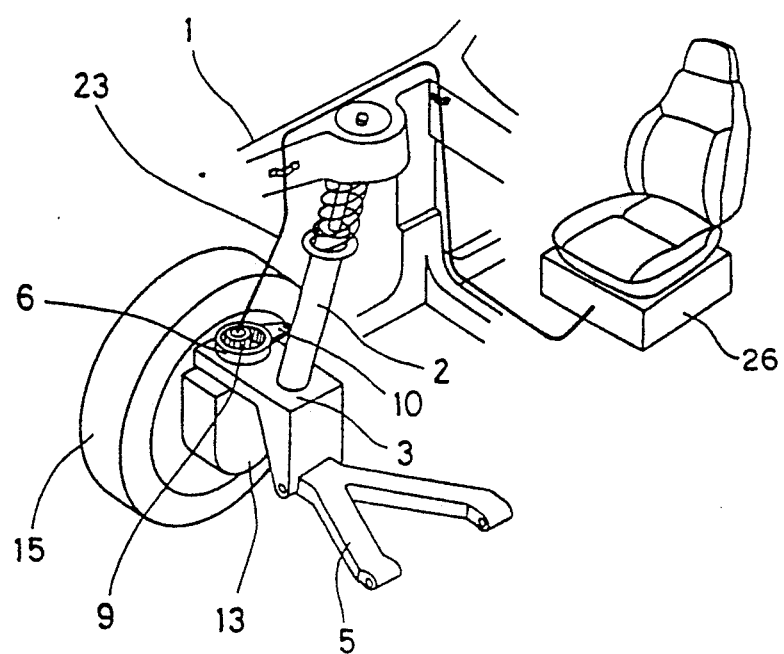
FIG. 1 is a perspective view schematically illustrating an embodiment of a wiring and conduit arrangement for a vehicle motor according to the invention.
Figure 2:
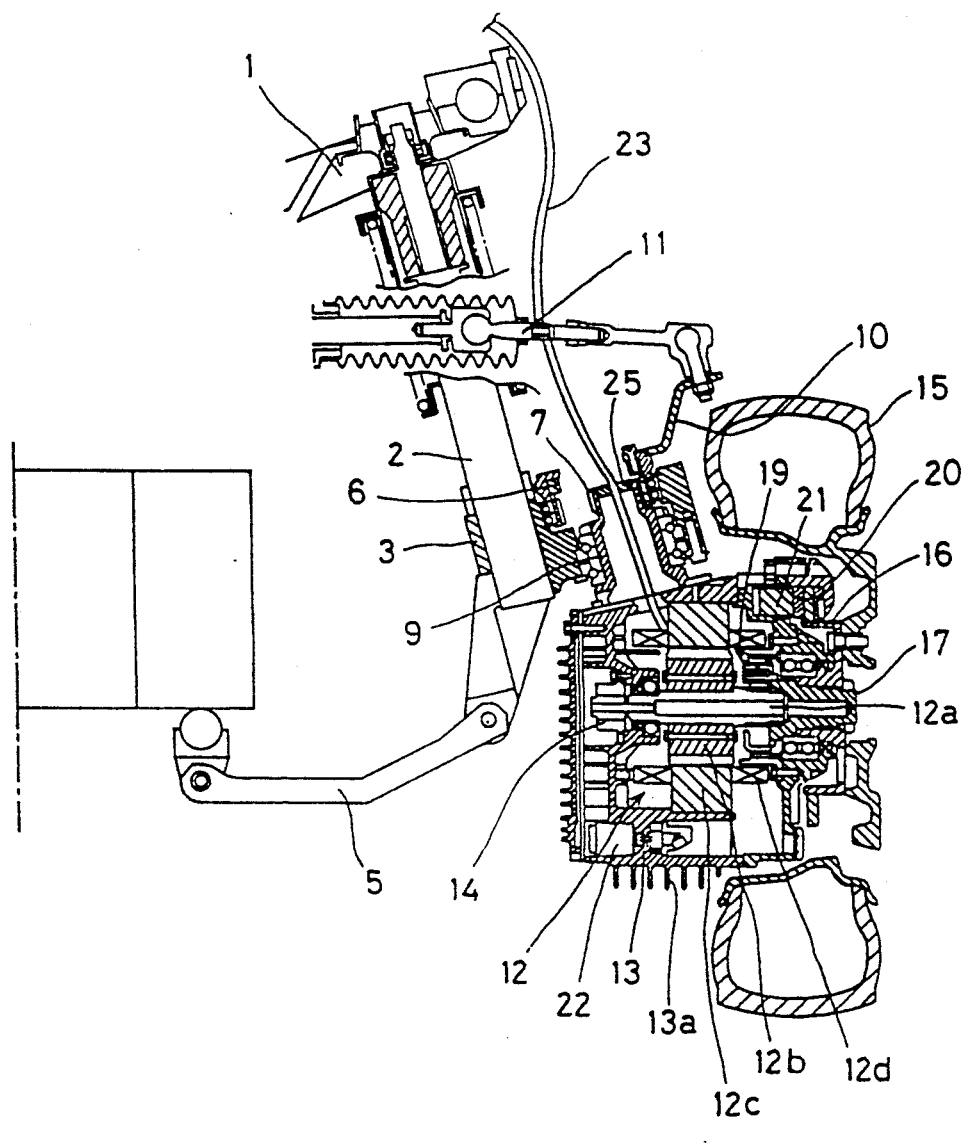
FIG. 2 is a cross section illustrating specific structures of that in FIG. 1.

Referring to FIGS. 1 and 2, a wheel support member 3 is connected to a vehicle frame 1 through a damper 2, and a lower arm 5 is pivotably connected to the wheel support member 3 to allow vertical movement of the wheel.

The wheel support member 3 rotatably supports an internal gear 6 and a pivot 9, which has an external gear 7 meshing with the internal gear 6, through respective bearings. A steering arm or knuckle arm 10 is fixed to the internal gear 6 and is connected to a tie rod 11. The above-mentioned pivot 9 is fixed at an upper surface of a casing 13 of a wheel motor 12. When a steering wheel (not shown) is turned, it turns the knuckle arm 10 through the tie rod 11, and the turning angle is increased by the internal and external gears 6 and 7. In this manner, a wheel 15 supported by the casing 13 can be pivoted through 90 degrees in both the right and left directions with respect to the straight advance direction.

Now, the wheel motor 12 will be discussed in detail. The casing 13 is provided at its outer surface with a large number of cooling fins 13a, and the wheel motor 12 is housed in the casing 13 in such a manner that a rotary shaft 12a thereof is supported at its one end by a bearing disposed at the side wall of the casing 13. A rotor 12b of the wheel motor 12 is fixed on the rotary shaft 12a, and a stator 12c, around which a coil 12d is wound, is fixed at an inner wall of the casing 13 in an opposed relationship to the rotor 12b. A motor rotational position detector 14 is disposed on the outer wall of the casing 13, and is fixed to the rotary shaft 12a.

The side wall of the casing 13 rotatably supports a wheel hub 16 through a bearing. An output rotary shaft 17 is splined onto the wheel hub 16, and an epicycle reduction gear 19 is disposed between the output rotary shaft 17 and the rotary shaft 12a. A brake disk 20 is splined onto the wheel hub 16, and a hydraulic piston 21 is provided for pressing the disk 20 toward the casing 13. An oil pump motor 22 is attached to a lower part of the casing 13 so as to circulate an oil for cooling the wheel motor 12.

One characteristic feature of the invention is that the wirings 23 for the coil 12d, motor rotational position detector 14 and oil pump motor 22 are extended from the interior of the casing 13 through the interior of the pivot 9 toward the vehicle frame 1, and are connected to a control device 26. A same or similar arrangement is employed for a conduit used to supply the oil to the hydraulic piston 21. The wirings 23 are fixed at an outlet of the pivot 9 by a seal member 25 to prevent the ingress of water or other matter from an external source, as well as to prevent leakage of the oil and damage to the wirings. Lengths of the wirings 23 between the seal member 25 and the vehicle frame 1 are determined to provide sufficient slack to allow a possible maximum vertical movement of the vehicle body.

Since the wirings 23 and hydraulic conduits are extended through the pivot 9 for steering operation of the wheel motor 12, the wirings and conduits are only required to have slack or extra lengths sufficient to accommodate the vertical movement of the wheel, and are not required to have slack for allowing the lateral movement of the wheel. Therefore, the wirings and conduits are not required to have excessive lengths, and thus interference with the suspension and contact with the road surface can be prevented.

Although particular preferred embodiments of the invention have been disclosed in detail for illustrative purposes, it will be recognized that other variations or modifications may be made without departing from the spirit and scope of the invention as claimed.

WHAT IS CLAIMED IS:

1. A vehicle wheel motor apparatus providing for connection of a wheel motor to a power source, said apparatus comprising:
   a wheel motor connected to a wheel;
   a wheel support member connected to a vehicle frame through a damper;
   an internal gear rotatably supported on the wheel support member;
   a pivot fixed to a casing of said wheel motor and provided with a hollow interior portion and an external gear meshing with said internal gear; and
   a power source lead connecting the power source to the wheel motor, said power source lead extending through said hollow interior portion of said pivot.

2. The vehicle wheel motor apparatus of claim 1 wherein said power source lead comprises electric wiring.

3. The vehicle wheel motor apparatus of claim 2 wherein said apparatus further comprises a wheel brake and wherein said power source lead further comprises a conduit for supplying hydraulic pressure to said wheel brake.

4. The vehicle wheel motor apparatus of claim 1 wherein said apparatus further comprises a wheel brake and wherein said power source lead comprises a conduit for supplying hydraulic pressure to said wheel brake.

5. The vehicle wheel apparatus of claim 1 wherein said damper is a shock absorber.

* * * * *